(12) United States Patent
Kurokawa et al.

(10) Patent No.: US 9,348,165 B2
(45) Date of Patent: May 24, 2016

(54) DISPLAY DEVICE AND ELECTRONIC BOOK

(75) Inventors: Yoshiyuki Kurokawa, Kanagawa (JP);
Takayuki Ikeda, Kanagawa (JP);
Takeshi Aoki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 837 days.

(21) Appl. No.: 13/085,259

(22) Filed: Apr. 12, 2011

(65) Prior Publication Data
US 2011/0255046 A1 Oct. 20, 2011

(30) Foreign Application Priority Data

Apr. 16, 2010 (JP) ................................. 2010-094600

(51) Int. Cl.
G02F 1/1333 (2006.01)
G09G 3/36 (2006.01)
G06F 3/041 (2006.01)
G06F 3/042 (2006.01)
G02F 1/133 (2006.01)
G02F 1/1334 (2006.01)

(52) U.S. Cl.
CPC ............ *G02F 1/13338* (2013.01); *G06F 3/042* (2013.01); *G06F 3/0412* (2013.01); *G09G 3/3648* (2013.01); *G02F 1/1334* (2013.01); *G02F 1/13318* (2013.01); *G02F 2001/13312* (2013.01); *G02F 2001/133391* (2013.01); *G09G 2360/142* (2013.01); *G09G 2380/14* (2013.01)

(58) Field of Classification Search
USPC .............................................. 349/25–28, 116
See application file for complete search history.

(56) References Cited

U.S. PATENT DOCUMENTS

| 6,236,063 | B1 | 5/2001 | Yamazaki et al. |
| 6,583,439 | B2 | 6/2003 | Yamazaki et al. |
| 6,747,638 | B2 | 6/2004 | Yamazaki et al. |
| 7,180,092 | B2 | 2/2007 | Yamazaki et al. |
| 7,525,523 | B2 | 4/2009 | Yamazaki et al. |
| 8,089,476 | B2 | 1/2012 | Ishiguro et al. |
| 2002/0074551 | A1* | 6/2002 | Kimura .......................... 257/72 |
| 2008/0158137 | A1 | 7/2008 | Yoshida |

(Continued)

FOREIGN PATENT DOCUMENTS

| JP | 2001-292276 A | 10/2001 |
| JP | 2004-317908 A | 11/2004 |

(Continued)

OTHER PUBLICATIONS

Kiyoshi Minoura et al.; "P-149: Super Reflective Color LCDs Being Able to Display Moving Images without Polarizers"; SID Digest '06 : SID International Symposium Digest of Technical Papers; Jun. 6, 2006; pp. 769-772; vol. 37, No. 1.

*Primary Examiner* — Wen-Ying P Chen
(74) *Attorney, Agent, or Firm* — Fish & Richardson P.C.

(57) ABSTRACT

It is an object to provide a display device exhibiting high visibility and having a touch recognition function. The display device includes a display portion and a sensor portion. The display portion includes a first liquid crystal element including a polymer-scattered liquid crystal. The sensor portion includes a light-receiving element and a second liquid crystal element including a polymer-dispersed liquid crystal provided over the light-receiving element. The first liquid crystal element and the second liquid crystal element are driven independently from each other. The light-receiving element receives light transmitting through the second liquid crystal element.

33 Claims, 12 Drawing Sheets

(56) References Cited

U.S. PATENT DOCUMENTS

| | | |
|---|---|---|
| 2008/0180583 A1* | 7/2008 | Harada et al. .................... 349/12 |
| 2009/0295769 A1 | 12/2009 | Yamazaki et al. |
| 2010/0085512 A1* | 4/2010 | Ueda et al. ...................... 349/68 |
| 2010/0117991 A1 | 5/2010 | Koyama et al. |
| 2013/0207125 A1 | 8/2013 | Yamazaki |

FOREIGN PATENT DOCUMENTS

| | | |
|---|---|---|
| JP | 2008-083322 A | 4/2008 |
| JP | 2009-036946 A | 2/2009 |

* cited by examiner

DISPLAY DEVICE AND ELECTRONIC BOOK

BACKGROUND OF THE INVENTION

1. Field of the Invention

The technical field of the present invention relates to a display device and a driving method thereof.

2. Description of the Related Art

As a display device which is thin and lightweight (a so-called flat-panel display), a liquid crystal display device including a liquid crystal element, a light-emitting device including a self-light-emitting element, a field emission display (an FED), and the like have been competitively developed.

In addition, since many optical members such as a polarizing plate and a backlight are used in a liquid crystal display device, there are problems with the liquid crystal display device in that, for example, cost or power consumption needs to be reduced.

As a measure against the above problems, a liquid crystal display device in which a polarizing plate and/or a backlight are/is necessarily involved and image display is performed by utilizing scattered light with a liquid crystal such as a Polymer Dispersed Liquid Crystal (PDLC) or a Polymer Network Liquid Crystal (PNLC) has been researched (see Non-Patent Document 1, for example). With the display device, high visibility equivalent to paper on which pictures or characters are drawn can be obtained.

Further, attention has been given to a display device provided with a light-detecting sensor (also referred to as a photosensor) (see Patent Document 1, for example). This display device can recognize the touch of an object on a display panel or the approach of an object to a display panel by detecting light. That is, the display device is equipped with a so-called touch recognition function.

REFERENCE

Patent Document

[Patent Document 1] Japanese Published Patent Application No. 2001-292276

Non-Patent Document

[Non-Patent Document 1] M. Minoura et al, SID 06 DIGEST, pp. 769-772

SUMMARY OF THE INVENTION

When the display device in the Non-Patent Document 1 and the display device in Patent Document 1 are combined together, a display device exhibiting high visibility and having the touch recognition function can be provided.

However, since a polymer-dispersed liquid crystal in the Non-Patent Document 1 causes a scattering of light, light might be hardly detected by a photosensor in the Patent-Document 1. For this reason, a display device in which a polymer-dispersed liquid crystal is used and touch recognition is performed by a photosensor has not been realized yet.

It is an object to provide a display device exhibiting high visibility and having the touch recognition function by utilizing a polymer-dispersed liquid crystal and effectively detecting light by a photosensor.

An embodiment of the present invention is a display device in which a polymer-dispersed liquid crystal is utilized and light detection is performed by a photosensor. A pixel portion of the display device includes a first liquid crystal element functioning as a display element and a second liquid crystal element controlling light receiving in the photosensor. Note that a polymer network liquid crystal may be used instead of a polymer-dispersed liquid crystal. A polymer-dispersed liquid crystal and a polymer network liquid crystal are collectively referred to as a polymer-scattered liquid crystal.

A portion including the first liquid crystal element and displaying images is referred to as a display portion. In addition, a portion including the second liquid crystal element and detecting light is referred to as a sensor portion.

In the display portion, the first liquid crystal element has a structure in which a pixel electrode, a liquid crystal layer, and a counter electrode are stacked in this order.

In the case where voltage is not applied between the pixel electrode and the counter electrode (the case also referred to as an off state), liquid crystal particles scatter incident light, so that the liquid crystal layer of the first liquid crystal element gets into a non-light-transmitting state.

Further, in the case where voltage is applied between the pixel electrode and the counter electrode (the case also referred to as an on state), liquid crystal particles are oriented, so that the liquid crystal layer of the first liquid crystal element gets into a light-transmitting state.

On the other hand, in the sensor portion, the second liquid crystal element has a structure in which a sensor electrode, a liquid crystal layer, and a counter electrode are stacked in this order. Here, it is characterized in that the sensor electrode is electrically independent of the pixel electrode. Then, a light-receiving element of the photosensor is provided below the sensor electrode. Note that the liquid crystal layer and the counter electrode are shared with the first liquid crystal element.

The liquid crystal layer of the second liquid crystal element gets into a non-light-transmitting state in the case where voltage is not applied between the sensor electrode and the counter electrode (the case also referred to as an off state), and gets into a light-transmitting state in the case where voltage is applied between the sensor electrode and the counter electrode (the case also referred to as an on state).

When light is received in the light-receiving element, voltage is applied between the sensor electrode and the counter electrode (the on state). That is, the liquid crystal layer of the second liquid crystal element is made into the light-transmitting state such that light enters into the light-receiving element. Then, the light-receiving element detects light irradiated from the detected object touching or approaching to the sensor portion, light reflected to the object, or light blocked by the object. Accordingly, touch recognition is performed.

One embodiment of the present invention is a display device including a display portion and a sensor portion. The display portion includes a first liquid crystal element including a polymer-dispersed liquid crystal. The sensor portion includes a light-receiving element and a second liquid crystal element including a polymer-dispersed liquid crystal provided over the light-receiving element. The first liquid crystal element and the second liquid crystal element are driven independently from each other. The light-receiving element receives light transmitting through the second liquid crystal element.

Another embodiment of the present invention is a display device including a display portion and a sensor portion. The display portion includes a pixel electrode, a counter electrode, and a first liquid crystal element that includes a polymer-dispersed liquid crystal and is provided between the pixel electrode and the counter electrode. The sensor portion includes a light-receiving element and a second liquid crystal element which includes a sensor electrode provided over the light-receiving element, a counter electrode, and a polymer-dispersed liquid crystal provided between the sensor electrode and the counter electrode. The pixel electrode and the sensor electrode are electrically independent of each other, so that the first liquid crystal element and the second liquid crystal element are driven electrically independently. The light-receiving element receives light transmitting through the second liquid crystal element.

Another embodiment of the present invention is a display device including a display portion including a display circuit and a sensor portion including a sensor circuit. The display circuit includes a first transistor controlling input of a video signal and a first liquid crystal element to which the video signal is input. The first liquid crystal element includes a pixel electrode, a counter electrode, and a polymer-dispersed liquid crystal provided between the pixel electrode and the counter electrode. The sensor circuit includes a light-receiving element converting light to an electric signal, a second transistor generating an output signal from the electric signal, a third transistor controlling reading of the output signal, and a second liquid crystal element. The second liquid crystal element includes a sensor electrode provided over the light-receiving element, a counter electrode, and a polymer-dispersed liquid crystal provided between the sensor electrode and the counter electrode. The pixel electrode and the sensor electrode are electrically independent of each other, so that the first liquid crystal element and the second liquid crystal element are driven electrically independently from each other. The light-receiving element receives light transmitting through the second liquid crystal element.

The first to third transistors can be formed using an oxide semiconductor in the above structure.

The light-receiving element and the first to third transistors can be formed using a single crystal semiconductor in the same layer in the above structure.

Another embodiment of the present invention is an electronic book using the above display device.

According to an embodiment of the present invention, by providing a sensor electrode which is electrically independent of a pixel electrode over a light-receiving element, light reception in the light-receiving element can be controlled by the second liquid crystal element, regardless of whether the display element (the first liquid crystal element) gets into the on state or gets into the off state. That is, a liquid crystal layer of the second liquid crystal element can be functioned as a switch for light reception.

Further, according to an embodiment of the present invention, a polymer-dispersed liquid crystal can be used and light can be detected effectively by a photosensor, so that a display device exhibiting high visibility and having touch recognition function can be provided.

DETAILED DESCRIPTION OF THE INVENTION

Figure 1A:
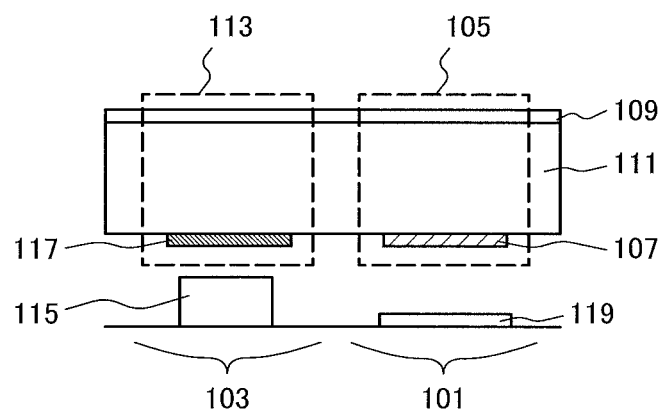
FIGS. 1A and 1B are diagrams showing an example of a structure of a display device.

Hereinafter, embodiments of the present invention will be described in detail with reference to the accompanying drawings. However, since the embodiments described below can be embodied in many different modes, it is easily understood by those skilled in the art that the mode and the detail can be variously changed without departing from the scope of the present invention. Therefore, the disclosed invention is not interpreted as being limited to the description of the embodiments below. Note that throughout the drawings for explaining the embodiments, the same portions or portions having similar functions to each other are denoted by the same reference numerals, and description of such portions is not repeated.

Embodiment 1

In this embodiment, examples of a display device will be described.

Figure 1B:
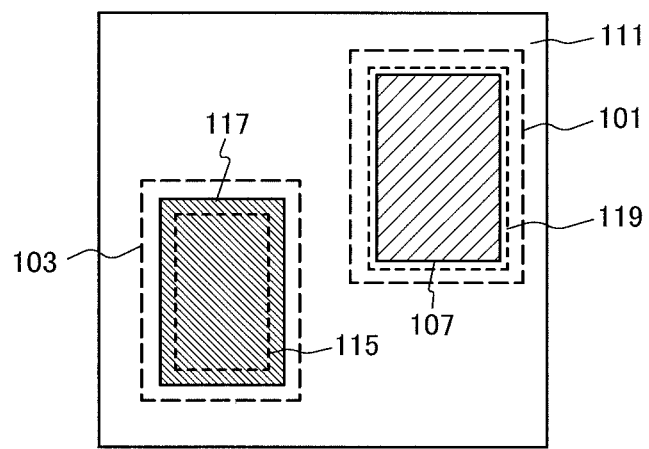

FIGS. 1A and 1B illustrate an example of a pixel portion of a display device. FIG. 1A is a cross-sectional view of the example, and FIG. 1B is a top view thereof.

The pixel portion includes a display portion 101 and a sensor portion 103.

As shown in FIG. 1A, the display portion 101 includes a first liquid crystal element 105. The first liquid crystal element 105 includes a pixel electrode 107, a counter electrode 109, and a liquid crystal layer 111 provided between the pixel electrode 107 and the counter electrode 109. That is, the first liquid crystal element 105 has a structure in which the pixel electrode 107, the liquid crystal layer 111, and the counter electrode 109 are stacked in this order. The first liquid crystal element 105 functions as a display element.

A polymer-dispersed liquid crystal is used in the liquid crystal layer 111, and liquid crystal particles are dispersed in a polymer layer forming a polymer network.

In the case where a voltage is not applied between the pixel electrode 107 and the counter electrode 109 (the case also referred to as an off state), liquid crystal molecules in the liquid crystal particles dispersed in the polymer layer are randomly arranged. Then, since the refractive index of the polymer and that of the liquid crystal molecules in a minor axis are different, incident light is scattered by the liquid crystal particles; thus, the liquid crystal layer 111 becomes white and turbid, which is a non-light-transmitting state. Consequently, display seen from the viewer side (the counter electrode 109 side) is white display (bright display).

In the case where voltage is applied between the pixel electrode 107 and the counter electrode 109 (the case also referred to as an on state), an electric field is formed in the liquid crystal layer 111, so that the liquid crystal molecules in the liquid crystal particles are arranged in an electric field direction. Then, the refractive index of the polymer and that of the liquid crystal molecules in the minor axis become almost equal to each other, so that incident light is not scattered by the liquid crystal particles but is transmitted through the liquid crystal layer 111. Consequently, the liquid crystal layer 111 gets into a light-transmitting state. At that time, display seen from the viewer side depends on materials provided over and below the liquid crystal layer 111. That is, when a black layer 119 is provided on the side (the pixel electrode 107 side) opposite from the viewer side of the liquid crystal layer 111, the black layer 119 can be seen. Consequently, display seen from the viewer side is black display (dark display).

The sensor portion 103 includes a second liquid crystal element 113 and a light-receiving element 115. The second liquid crystal element 113 includes a sensor electrode 117, the counter electrode 109, and the liquid crystal layer 111 provided between the sensor electrode 117 and the counter electrode 109. That is, the second liquid crystal element 113 has a structure in which the sensor electrode 117, the liquid crystal layer 111, and the counter electrode 109 are stacked in this order.

The light-receiving element 115 is provided below the sensor electrode 117: note that at least a portion of the light-receiving element 115 in which light is received (also referred to as a light-receiving portion) is provided below the sensor electrode 117. In addition, the sensor electrode 117 is preferably provided so as to cover the light-receiving portion. By providing the sensor electrode 117 to cover the light-receiving portion, light can be irradiated to the entire surface of the light-receiving portion; thus, the amount of light received can be increased.

Here, the liquid crystal layer 111 is commonly used in the first liquid element 105 and the second liquid crystal element 113.

Further, the counter electrode 109 is shared with the first liquid element 105 and the second liquid crystal element 113. Their respective counter electrodes may be provided separately and electrically connected by a wiring. Alternatively, their respective counter electrodes may be provided separately and electrically independent of each other. Note that when the counter electrode is shared, the number of manufacturing steps can be reduced, which is preferable. Note that the counter electrode 109 is also referred to as a common electrode.

The pixel electrode 107 and the sensor electrode 117 are electrically independent of each other. Thus, the display device in this embodiment has a function of driving the first liquid crystal element 105 and the second liquid crystal element 113 electrically independently of each other.

FIG. 1B is a top view of FIG. 1A. The display portion 101 and the sensor portion 103 are provided in different positions. In the sensor portion 103, the light-receiving element 115 is provided below the sensor electrode 117. Note that FIG. 1B is a transparent top view of FIG. 1A.

In this manner, by providing the sensor electrode 117 which is electrically independent of the pixel electrode 107 over the light-receiving element 115, light reception in the light-receiving element 115 can be controlled by the second liquid crystal element 113, regardless of whether the first liquid crystal element (display element) 105 is turned on or turned off.

That is, the liquid crystal layer 111 of the second liquid crystal element 113 can be functioned as a switch for light reception.

Next, one example of a circuit configuration of the display portion 101 and one example of a circuit configuration of the sensor portion 103 will be described.

Figure 2A:
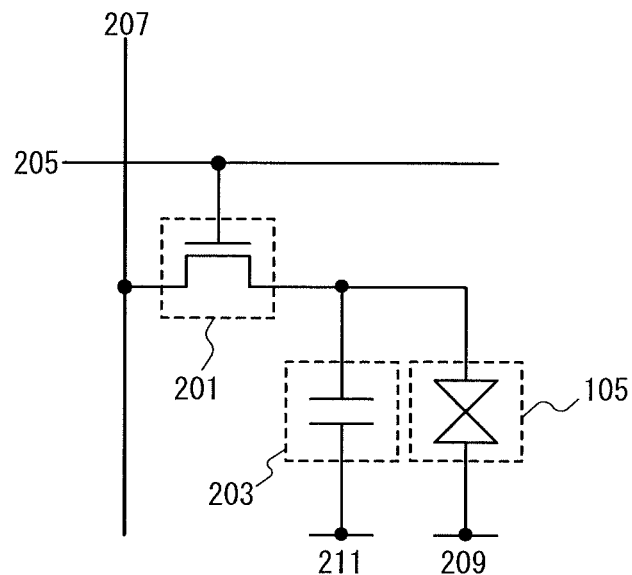
FIGS. 2A and 2B are diagrams showing an example of a circuit configuration of the display device.

FIG. 2A shows one example of a circuit included in the display portion 101 (the circuit also referred to as a display circuit).

The display circuit includes a transistor 201, the first liquid crystal element 105, and a capacitor 203.

A gate of the transistor 201 is electrically connected to a wiring 205 (also referred to as a gate signal line), one of a source and a drain of the transistor 201 is electrically connected to a wiring 207 (also referred to as a source signal line), and the other of the source and the drain of the transistor 201 is electrically connected to one electrode of the first liquid crystal element 105 (the pixel electrode 107) and one electrode of the capacitor 203.

Then, the other electrode of the first liquid crystal element 105 (the counter electrode 109) is electrically connected to a wiring 209.

The other electrode of the capacitor 203 is electrically connected to a wiring 211. The wiring 209 and the wiring 211 may be electrically connected to each other.

The transistor 201 has a function as a switching element and a function of controlling input (writing) of a video signal from the wiring 207 to the first liquid crystal element 105.

The first liquid crystal element 105 has a function of displaying images, in which the light transmittance of the liquid crystal layer is controlled in accordance with the video signals inputted to the pixel electrode 107. By using a polymer-dispersed liquid crystal for the first liquid crystal element 105, high visibility equivalent to paper on which pictures or characters are drawn can be obtained.

Note that the capacitor 203 has a function of holding a video signal inputted to the first liquid crystal element 105.

Figure 2B:
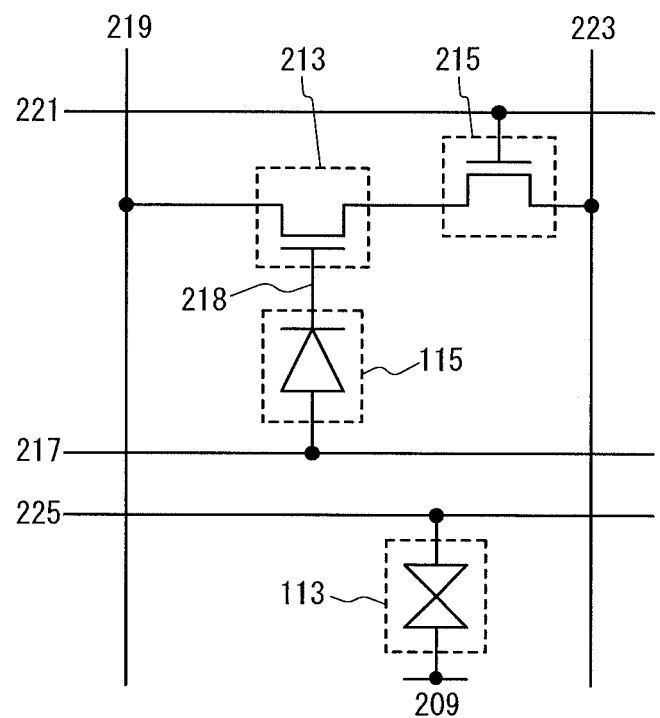

FIG. 2B shows one example of a circuit (also referred to as a sensor circuit or a photo sensor) included in the sensor portion 103.

The sensor circuit includes the light-receiving element 115, a transistor 213, a transistor 215, and the second liquid crystal element 113.

One electrode of the light-receiving element 115 is electrically connected to a wiring 217 (also referred to as a reset signal line), and the other electrode of the light-receiving element 115 is electrically connected to a gate of the transistor 213 through a wiring 218.

One of a source and a drain of the transistor 213 is electrically connected to a wiring 219, and the other of the source and the drain of the transistor 213 is electrically connected to one of a source and a drain of the transistor 215.

A gate of the transistor 215 is electrically connected to a wiring 221 (also referred to as a selection signal line), and the other of the source and the drain of the transistor 215 is electrically connected to a wiring 223 (also referred to as an output line).

Then, one electrode of the second liquid crystal element 113 (the sensor electrode 117) is electrically connected to a wiring 225, and the other electrode of the second liquid crystal element 113 (the counter electrode 109) is electrically connected to the wiring 209.

The light-receiving element 115 has a function of converting incident light to an electric signal (electric charge). The converted electric signal is input to the transistor 213. A light-receiving element as a photodiode is shown in FIG. 2B; however, a light-receiving element having that function, such as a phototransistor, can also be used.

The electric signals converted by the light-receiving element 115 are input to the transistor 213. The transistor 213 has a function of amplifying the electric signals (the electric charge) and generating output signals. Thus, the transistor 213 is also referred to as an amplifying transistor.

The transistor 215 has a function of controlling the reading of the output signals. For example, the output from one sensor circuit is selected among a plurality of sensor circuits by the transistor 215; thus, the transistor 215 is also referred to as a selection transistor.

Since the second liquid crystal element 113 includes the sensor electrode 117 electrically independent of the pixel electrode 107, the second liquid crystal element 113 can be driven independent of the first liquid crystal element 105.

Next, one example of a driving method of a sensor circuit will be described.

Figure 3:
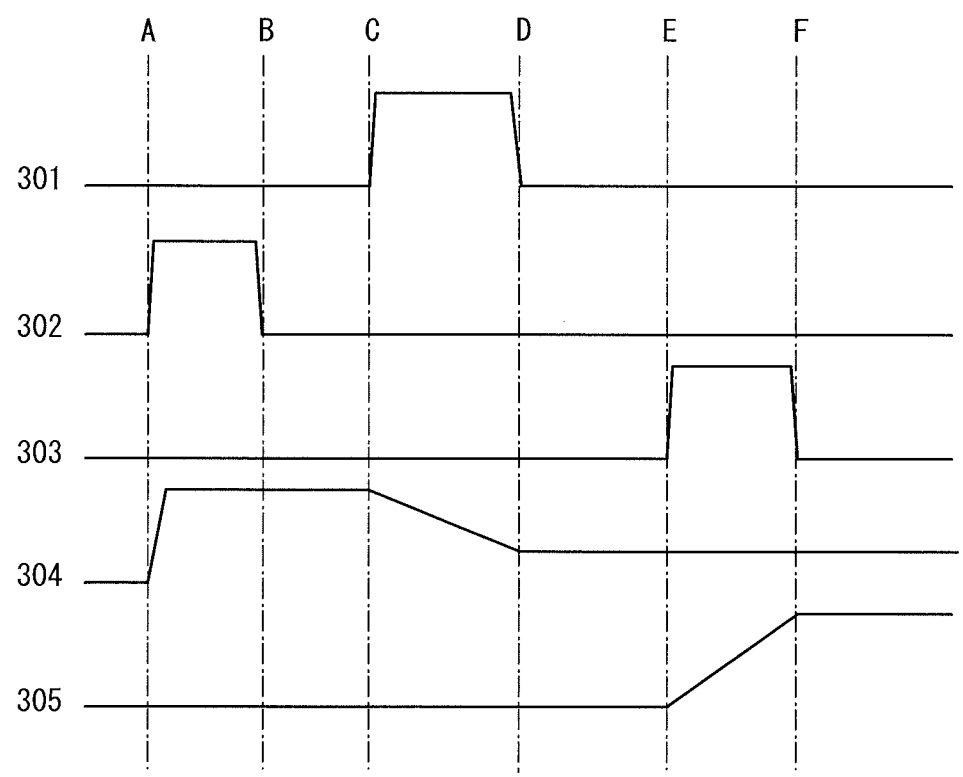
FIG. 3 is a diagram showing an example of a timing chart.

FIG. 3 is one example of a timing chart of the sensor circuit shown in FIG. 2B.

In FIG. 3, signals 301, 302, 303, 304, and 305 are potentials of the wiring 225, 217, 221, 218, and 223 in FIGS. 2A and 2B, respectively.

At a time A, the signal 302 is set to "H" (High), whereby the light-receiving element 115 (photodiode) is turned on, and then the signal 304 becomes to "H" (reset operation starts).

At a time B, the signal 302 is set to "L" (Low), whereby the signal 304 is held at "H" (the reset operation ends).

At a time C, the signal 301 is set to "H", whereby the second liquid crystal element 113 is turned on, and then incident light transmits through the second liquid crystal element 113; thus, light reception in the light-receiving element 115 starts (accumulation operation starts). As light is received in the light-receiving element 115, the amount of reverse current increases, leading to a decrease in the potential of the signal 304 in accordance with the amount of incident light.

At a time D, the signal 301 is set to "L", whereby the signal 304 is fixed constant (the accumulation operation ends). Here, the fixed potential of the signal 304 is determined in accordance with the amount of the electric charge that has been supplied to the wiring 218 from the light-receiving element 115 during the accumulation operation. That is, the amount of the electric charge accumulated in the gate of the transistor 213 changes depending on the amount of light incident to the light-receiving element 115.

At a time E, the signal 303 is set to "H", whereby the transistor 215 is turned on and the wiring 219 and the wiring 223 are electrically connected to each other through the transistor 213 and the transistor 215 (selection operation (also referred to as reading operation) starts). Then, the potential of the signal 305 starts to increase accordingly. Here, the rate at which the potential of the signal 305 is increased depends on the source-drain current of the transistor 213. That is, the rate is changed in accordance with the amount of light incident to the light-receiving element 115 during the accumulation operation.

At a time F, the signal 303 is set to "L", whereby the transistor 215 is turned off and the signal 305 is fixed constant. Here, the fixed potential of the signal 305 changes in accordance with the amount of light incident to the light-receiving element 115. Consequently, the amount of light incident to the light-receiving element 115 during the accumulation operation can be detected by obtaining the potential of the signal 305.

Note that the potential of the wiring 219 is fixed at "H" and the potential of the wiring 223 is predetermined at "L". However, without limitation thereto, the potential of the wiring 219 may be fixed at "L" and the potential of the wiring 223 may be predetermined at "H".

In addition, the accumulation operation is performed during the period between the time C and the time D, and by controlling length of this period, the amount of light received in the light-receiving element 115 can be controlled.

In such a manner, the sensor circuit can detect light incident to the light-receiving element 115 by controlling the second liquid crystal element 113. By detecting the incident light with the object touched or approached to the display, touch recognition can be performed.

While light detection is performed in the sensor circuit, the first liquid crystal element 105 is controlled in the display circuit, whereby images can be displayed as described above.

In other words, the first liquid crystal element 105 and the second liquid crystal element 113 are driven electrically independently of each other, whereby light reception can be performed in the light-receiving element 115 and light detection can be performed in the sensor circuit, regardless of whether the first liquid crystal element 105 is turned on or turned off.

With the above structure, light detection in the sensor circuit with the use of a polymer-dispersed liquid crystal can be effectively performed, whereby a display device having high visibility and the touch recognition function can be provided.

Then, the display device can be applied to an electronic book (electronic paper), for example, and high visibility equivalent to paper on which pictures or characters are drawn can be obtained.

In addition, image reading can be performed by using the touch recognition function; thus, a display device equipped with a scanner function can be provided. In that case, by providing light for irradiating an object, images can be read at high accuracy.

This embodiment can be combined with any of the other embodiments as appropriate.

Embodiment 2

In this embodiment, examples of the structure and manufacturing method of a display device will be described.

Figure 4:
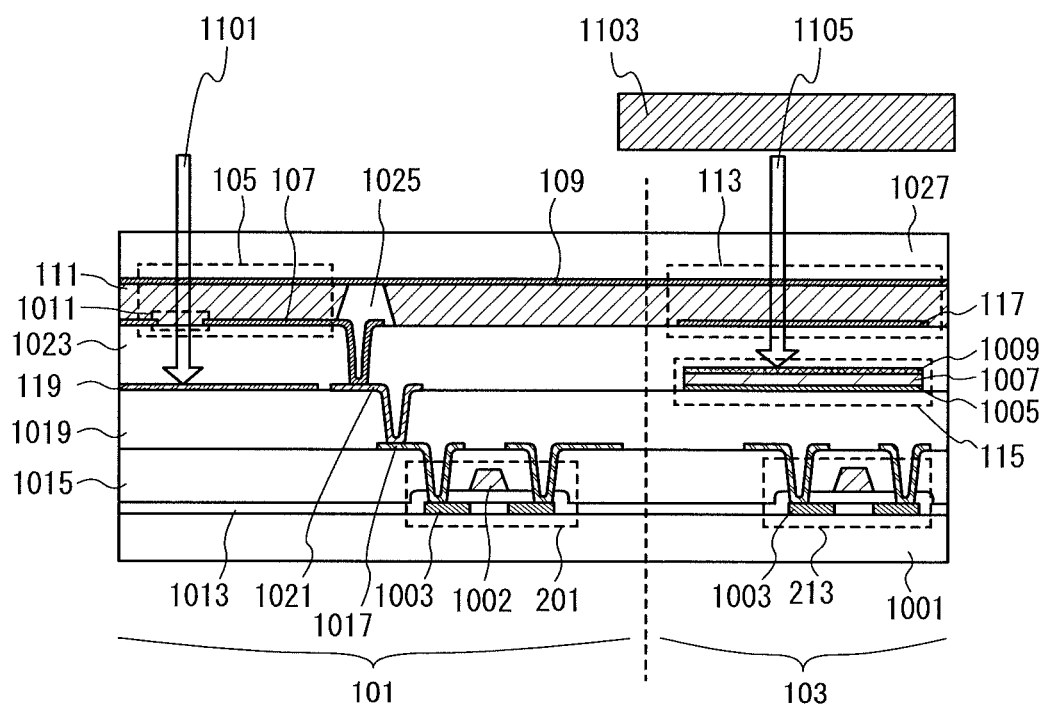
FIG. 4 is a diagram showing an example of a structure of the display device.

FIG. 4 is one example of a cross-sectional view of a pixel portion of a display device.

The pixel portion includes a display portion 101 and a sensor portion 103. FIG. 4 shows the state in which light 1101 (e.g., external light) enters the display portion 101 and light 1105 from an object 1103 to be detected enters a light-receiving element 115 in the sensor portion 103. The object 1103 is, for example, a finger or paper.

A transistor 201, a transistor 213, the light-receiving element 115, a first liquid crystal element 105, and a second liquid crystal element 113 are provided over an insulator 1001.

A glass substrate, a quartz substrate, a plastic substrate, or the like can be used as the insulator 1001. The insulator 1001 can be used in which an insulating layer formed as a single layer or a stacked layer using a silicon oxide film, a silicon nitride film, or the like over any of these substrates, a semiconductor substrate, a metal substrate, or the like. An inexpensive glass substrate is used, so that manufacturing cost can be reduced.

The transistor 201 is the same as the transistor 201 of the display circuit in FIG. 2A.

The transistor 213 is the same as the transistor 213 of the sensor circuit in FIG. 2B.

In FIG. 4, top-gate thin film transistors are used as the transistors 201 and 213; however, this embodiment is not limited thereto. A bottom-gate thin film transistor may also be used as the transistors 201 and 213, and a channel-etched transistor or a channel-stop transistor can be used.

As a semiconductor layer 1003 of the transistors 201 and 213, a crystalline semiconductor layer can be used. For example, polycrystalline silicon can be used. However, this embodiment is not limited thereto. Amorphous silicon, microcrystalline silicon, single crystal silicon, an organic semiconductor such as pentacene, an oxide semiconductor, or the like may be used for the semiconductor layer 1003.

When the semiconductor layer 1003 is formed using single crystal silicon, the insulator 1001 is bonded to a single crystal silicon substrate in which a damaged region is provided at a predetermined depth from the surface, and the single crystal silicon substrate is separated along the damaged region. By using single crystal silicon, a transistor having high field effect mobility can be provided. Here, the damaged region means a region damaged by irradiation of the single crystal silicon substrate with hydrogen ions and the like.

When the semiconductor layer 1003 is formed using an oxide semiconductor, a composite oxide of an element selected from indium, gallium, aluminum, zinc, and tin can be used. By using an oxide semiconductor, a transistor with extremely low off-state current can be provided.

Note that the transistors 201 and 213 may be formed using different materials from each other and may have different structures.

The light-receiving element 115 is a vertical junction PIN photodiode and has a structure in which an n-type semiconductor layer 1005, an i-type semiconductor layer 1007, and a p-type semiconductor layer 1009 are stacked in this order. The n-type semiconductor layer 1005 contains an impurity element imparting one conductivity type (e.g., phosphorus). The i-type semiconductor layer 1007 is an intrinsic semiconductor. The p-type semiconductor layer 1009 contains an impurity element imparting one conductivity type (e.g., boron). However, the present invention is not limited thereto. The light-receiving element 115 may be a lateral junction PIN photodiode. The light-receiving element 115 may be a vertical-junction or a lateral junction PN photodiode. Alternatively, a phototransistor or the like may be used. Note that each semiconductor layer of the light-receiving element 115 can be formed using microcrystalline silicon, polycrystalline silicon, single crystal silicon, or the like.

The first liquid crystal element 105 is the same as the first liquid crystal element 105 of the display circuit in FIG. 2A. The first liquid crystal element 105 includes a pixel electrode 107, a counter electrode 109, a liquid crystal layer 111 provided between the pixel electrode 107 and the counter electrode 109. A black layer 119 is provided below the pixel electrode 107. The pixel electrode 107 and the counter electrode 109 are formed using a light-transmitting material.

When the first liquid crystal element 105 gets into an off state and the liquid crystal layer 111 does not transmit light, the light 1101 is scattered by the liquid crystal layer 111, whereby white is displayed.

When the first liquid crystal element 105 gets into an on state and the liquid crystal layer 111 transmits light, the light 1101 transmits the first liquid crystal element 105, whereby the black layer 119 can be seen, that is, black is displayed. In order to increase the visibility of the black layer 119, an opening 1011 may be formed in the pixel electrode 107. When the opening 1011 is formed, the pixel electrode 107 may be formed using a material which does not have a light-transmitting property. In the case where black can be displayed in the pixel electrode 107 by absorbing light or reflecting light, the black layer 119 is not necessarily provided.

The second liquid crystal element 113 is the same as the second liquid crystal element 113 of the sensor circuit in FIG. 2B. The second liquid crystal element 113 includes a sensor electrode 117, the counter electrode 109, and the liquid crystal layer 111 provided between the sensor electrode 117 and the counter electrode 109. The light-receiving element 115 is provided below the sensor electrode 117. Note that at least a light-receiving portion of the light-receiving element 115 is provided below the sensor electrode 117.

As described in Embodiment 1, the pixel electrode 107 and the sensor electrode 117 are electrically independent of each other; thus, light can be detected while images are displayed.

Next, one example of a manufacturing method of a liquid crystal display device shown in FIG. 4 is briefly described.

First, a top-gate thin film transistor including a gate electrode 1002, a gate insulating film 1013, and the semiconductor layer 1003 is formed over the insulator 1001, whereby the transistors 201 and 213 are formed in the same steps. An n-type thin film transistor or a p-type thin film transistor can be used as the transistors 201 and 213. Alternatively, a bulk transistor can be used instead of the thin film transistor. In the case where the transistors 201 and 213 are bulk transistors, a semiconductor substrate can be used instead of the insulator 1001.

The gate electrode 1002 is formed using a conductive layer with a single-layer structure or a stacked-layer structure using a metal material such as molybdenum, titanium, tantalum, tungsten, aluminum, copper, neodymium, or scandium, or an alloy material that contains any of these materials as its main component.

In the same steps as the transistors 201 and 213, the storage capacitor 203 in FIG. 2A and the transistor 215 in FIG. 2B can be formed. In this case, the storage capacitor 203 has a structure as follows: the storage capacitor may use the semiconductor layer 1003 as a lower electrode, a capacitor wiring as an upper electrode, and an insulating film, which is formed in the same step as the gate insulating film 1013 of the transistors 201 and 213, as a dielectric. Note that the gate insulating film 1013 is formed as a single layer or stacked layers using a silicon oxide film or a silicon nitride film The storage wiring may be formed in the same step as the gate electrode 1002.

An insulating layer 1015 is formed over the transistors 201 and 213. The insulating layer 1015 is formed as a single layer or stacked layers using a silicon oxide film or a silicon nitride film.

Then, a contact hole is formed in the insulating layer 1015 and an electrode 1017 (a source electrode, a drain electrode, or the like) which is electrically connected to the transistors 201 and 213 is formed.

The electrode 1017 is formed using a conductive layer with a single-layer structure or a stacked-layer structure using a metal material such as aluminum, chromium, tantalum, titanium, molybdenum, or tungsten, or an alloy that contains any of these materials as its main component.

Next, an insulating layer 1019 is formed to cover the electrode 1017. The insulating layer 1019 is formed as a single layer or stacked layers using a silicon oxide film, a silicon nitride film, or the like.

Then, a contact hole is formed in the insulating layer 1019 and the black layer 119 and an electrode 1021 are formed over the insulating layer 1019.

The electrode 1021 is formed using a conductive layer with a single-layer structure or a stacked-layer structure using a metal material such as aluminum, chromium, tantalum, titanium, molybdenum, or tungsten, or an alloy that contains any of these materials as its main component.

The black layer 119 can be formed using, for example, a black organic resin and may be formed by mixture of a black resin of a pigment material, carbon black, titanium black, or the like into a resin material such as photosensitive or non-photosensitive polyimide. Alternatively, a light-blocking metal film that absorbs light can be used. Chromium may be used, for example.

There is no particular limitation on the formation method of the black layer 119, and a dry process such as vapor deposition, sputtering, or CVD or a wet process such as spin coating, dip coating, spray coating, or droplet discharging (e.g., ink jetting, screen printing, or offset printing) may be used depending on the material. If needed, etching (dry etching or wet etching) may be employed so that the black layer 119 is form to have a desired pattern. In addition, in order to prevent diffusion of a contamination substance from the black layer 119, an overcoat layer may be formed over and below the black layer 119.

Note that color display may be performed using one or more of red, green, blue, cyan, magenta, yellow, and the like, instead of the black layer 119. A layer with black and a different color is referred to as a color layer.

Next, an electrode (not illustrated) which electrically connects the transistor 213 and the light-receiving element 115 is formed, and then the light-receiving element 115 is formed over the insulating layer 1019. The light-receiving element 115 is formed by stacking the n-type semiconductor layer 1005, the i-type semiconductor layer 1007, and the p-type semiconductor layer 1009 in this order. In this embodiment, amorphous silicon containing phosphorus, amorphous silicon, and amorphous silicon containing boron are stacked as the n-type semiconductor layer 1005, the i-type semiconductor layer 1007, and the p-type semiconductor layer 1009, respectively, by a plasma CVD method.

Next, an insulating layer 1023 is formed over the black layer 119, the electrode 1021, and the light-receiving element 115. The insulating layer 1023 is formed as a single layer or stacked layers using a silicon oxide film, a silicon nitride film, a resin film, or the like.

Next, a contact hole is formed in the insulating layer 1023, and the pixel electrode 107 and the sensor electrode 117 are formed over the insulating layer 1023.

The pixel electrode 107 can be formed using a light-transmitting conductive layer. In this case, the black layer 119 can be seen through the first liquid crystal element 105. The light-transmitting conductive layer can be formed using indium tin oxide (ITO), indium zinc oxide (IZO) in which zinc oxide (ZnO) is mixed in indium oxide, a conductive material in which silicon oxide (SiO$_2$) is mixed in indium oxide, organic indium, organic tin, indium oxide containing tungsten oxide, indium zinc oxide containing tungsten oxide, indium oxide containing titanium oxide, indium tin oxide containing titanium oxide, or the like.

In addition, the pixel electrode 107 may be formed using a conductive layer having a reflective property. In this case, an opening 1011 is provided in the pixel electrode 107, so that the black layer 119 provided below the pixel electrode 107 can be seen through the opening 1011. The conductive layer having a reflective property can be formed using one or more kinds of materials selected from a metal such as tungsten, molybdenum, zirconium, hafnium, vanadium, niobium, tantalum, chromium, cobalt, nickel, titanium, platinum, aluminum, copper, and silver; an alloy of any of these metals; and a nitride of any of these metals. With this structure, even if light scattering in the liquid crystal layer 111 is not performed enough, light can be reflected in the pixel electrode 107; thus, white display can be effectively performed.

The sensor electrode 117 can be formed using a light-transmitting conductive layer. In this case, light enters the light-receiving element 115 provided below the sensor electrode 117 when the second liquid crystal element 113 gets into an on state. The light-transmitting conductive layer can be formed using an indium tin oxide (ITO), indium zinc oxide (IZO) in which zinc oxide (ZnO) is mixed in indium oxide, a conductive material in which silicon oxide (SiO$_2$) is mixed in indium oxide, organic indium, organic tin, indium oxide containing tungsten oxide, indium zinc oxide containing tungsten oxide, indium oxide containing titanium oxide, indium tin oxide containing titanium oxide, or the like. In addition, the sensor electrode 117 is preferably formed to cover the light-receiving portion of the light-receiving element 115. By providing the sensor electrode 117 to cover the light-receiving portion, light can enter the entire surface of the light-receiving portion; thus, the amount of light received can be increased.

Then, a spacer 1025 is formed over the insulating layer 1023. A columnar spacer (a post spacer) or a spherical spacer (a bead spacer) can be used as the spacer 1025.

Next, the liquid crystal layer 111 is formed using polymer-dispersed liquid crystal. The polymer-dispersed liquid crystal has a structure in which liquid crystal particles are dispersed in a polymer layer forming a polymer network.

A nematic liquid crystal can be used for the liquid crystal particles.

A photocurable resin can be used for the polymer layer. The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may be liquid crystalline, non-liquid crystalline, or may be in both of the states. A resin which is cured with light having a wavelength with which a photopolymerization initiator to be used is reacted may be selected as the photocurable resin, and an ultraviolet curable resin can be typically used.

For example, the liquid crystal layer 111 can be formed in such a manner that a liquid crystal material including a liquid crystal particle using a nematic liquid crystal, a polymer layer using a photocurable resin, and a photopolymerization initiator is irradiated with light having a wavelength with which the photocurable resin and the photopolymerization initiator are reacted and cured.

As the photopolymerization initiator, a radical polymerization initiator that generates radicals by light irradiation, an acid generator that generates an acid by light irradiation, or a base generator that generates a base by light irradiation may be used.

The liquid crystal layer 111 can be formed by a dispenser method (a dripping method), or an injection method after a counter substrate is formed.

Further, a liquid crystal exhibiting a blue phase may be used for the liquid crystal layer 111. A blue phase is one of liquid crystal phases, which is generated just before a cholesteric phase changes into an isotropic phase while the temperature of a cholesteric liquid crystal is increased. Since the blue phase appears only in a narrow temperature range, in order to use the liquid crystal exhibiting a blue phase in the liquid crystal layer 111, a liquid crystal composition in which a chiral material is mixed at 5 wt. % or more is used to broaden the temperature range. As for the liquid crystal composition that contains a liquid crystal exhibiting a blue phase and a chiral material, the response speed is 10 μs to 100 μs, alignment is not necessary because of optical isotropy, and viewing angle dependence is low.

Next, a counter substrate 1027 provided with the counter electrode 109 and the insulator 1001 are bonded to each other with a sealant.

The counter electrode 109 is formed using a light-transmitting conductive material. For example, the counter electrode 109 can be formed using an indium tin oxide (ITO), indium zinc oxide (IZO) in which zinc oxide (ZnO) is mixed in indium oxide, a conductive material in which silicon oxide (SiO$_2$) is mixed in indium oxide, organic indium, organic tin, indium oxide containing tungsten oxide, indium zinc oxide containing tungsten oxide, indium oxide containing titanium oxide, indium tin oxide containing titanium oxide, or the like.

Since the counter substrate 1027 is formed on the viewer side, it is formed using a light-transmitting material. As the light-transmitting material, a glass substrate, a quartz substrate, a plastic substrate, or the like can be used.

This embodiment can be combined with any of the other embodiments as appropriate.

Embodiment 3

In this embodiment, examples of the structure and manufacturing method of a display device will be described.

Figure 5:
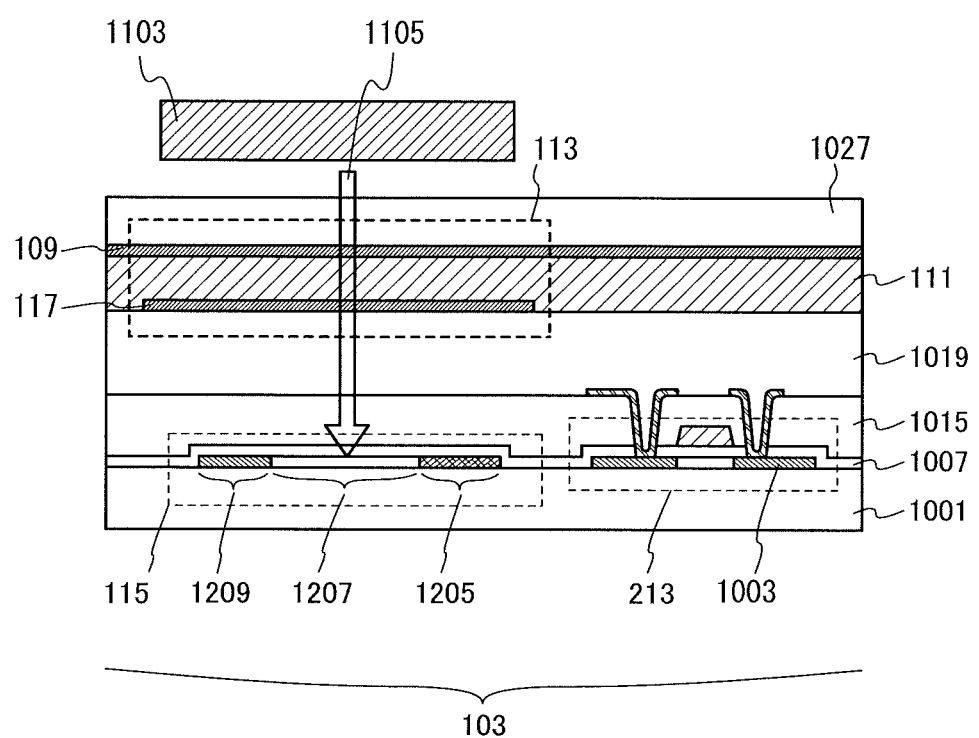
FIG. 5 is a diagram showing an example of a structure of the display device.

FIG. 5 is one example of a cross-sectional view of a pixel portion of the display device. An example of a structure that is different from the structure of the sensor portion 103 in FIG. 4 is shown.

In FIG. 5, a lateral junction photodiode is used as a light-receiving element 115.

In the light-receiving element 115, an n-type semiconductor layer 1205, an i-type semiconductor layer 1207, and a p-type semiconductor layer 1209 are provided in the same layer. The n-type semiconductor layer 1205 contains an impurity element imparting one conductivity type (e.g., phosphorus). The i-type semiconductor layer 1207 is an intrinsic semiconductor. The p-type semiconductor layer 1209 contains an impurity element imparting one conductivity type (e.g., boron). However, the present invention is not limited thereto. The light-receiving element 115 may be a PN photodiode. Alternatively, a phototransistor or the like may be used.

Since the light-receiving element 115 is a lateral junction type, each semiconductor layer of the light-receiving element 115 can be formed in the same layer as a semiconductor layer 1003 of a transistor 213 in the same step. By manufacturing in the same step, the same materials can be used; thus, the number of manufacturing steps and manufacturing cost can be reduced.

In particular, when single crystal silicon is used for each semiconductor layer of the light-receiving element 115 and the semiconductor layer 1003 of the transistor 213, as described in Embodiment 2, an insulator 1001 is bonded to a single crystal silicon substrate in which a damaged region is provided at a predetermined depth from the surface, and the single crystal silicon substrate is separated along the damaged region. Thus, single crystal silicon is used for each semiconductor layer of the light-receiving element 115 and the semiconductor layer 1003 of the transistor 213 can be formed. With the use of single crystal silicon, the crystallinity can be increased and the quantum efficiency of the light-receiving element 115 can be improved.

Note that each semiconductor layer of the light-receiving element 115 and the semiconductor layer 1003 of the transistor 213 may be formed in different layer and may be formed using different materials from one another.

This embodiment can be combined with any of the other embodiments as appropriate.

Embodiment 4

An oxide semiconductor will be described as a material that can be used for the semiconductor layers of the transistors in Embodiments 1 to 3.

An oxide semiconductor can be used as the semiconductor layer 1003 of the transistors 201, 213, and 215 in Embodiment 2.

As the oxide semiconductor used for the semiconductor layer 1003, In—Sn—Ga—Zn—O, In—Ga—Zn—O, In—Sn—Zn—O, In—Al—Zn—O, Sn—Ga—Zn—O, Al—Ga—Zn—O, Sn—Al—Zn—O, In—Zn—O, Sn—Zn—O, Al—Zn—O, Zn—Mg—O, Sn—Mg—O, In—Mg—O, In—O, Sn—O, or Zn—O can be used. Further, $SiO_2$ may be contained in the oxide semiconductor.

Here, for example, an In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn.

As the oxide semiconductor, a thin film represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In a transistor including an oxide semiconductor, the current in an off state (off-state current) can be made small. For this reason, when the transistor 201 in the display circuit includes an oxide semiconductor, electric signals such as video signals can be held longer, and the writing interval can be set longer in an on state. Consequently, the frequency of refresh operation can be decreased, whereby power consumption can be further suppressed.

Further, a transistor including an oxide semiconductor can have high field effect mobility. For this reason, when the transistors 201, 213, and 215 that are included in display circuits and sensor circuits include an oxide semiconductor, the display circuits and the sensor circuits can be driven at high speed.

Moreover, since a driver circuit portion and the pixel portion can be separately formed over one substrate by using the transistors, the number of components of the display device can be reduced.

This embodiment can be implemented in appropriate combination with the structures described in the other embodiments.

Embodiment 5

In this embodiment, examples of a driving method of a sensor circuit will be described.

Figure 6:
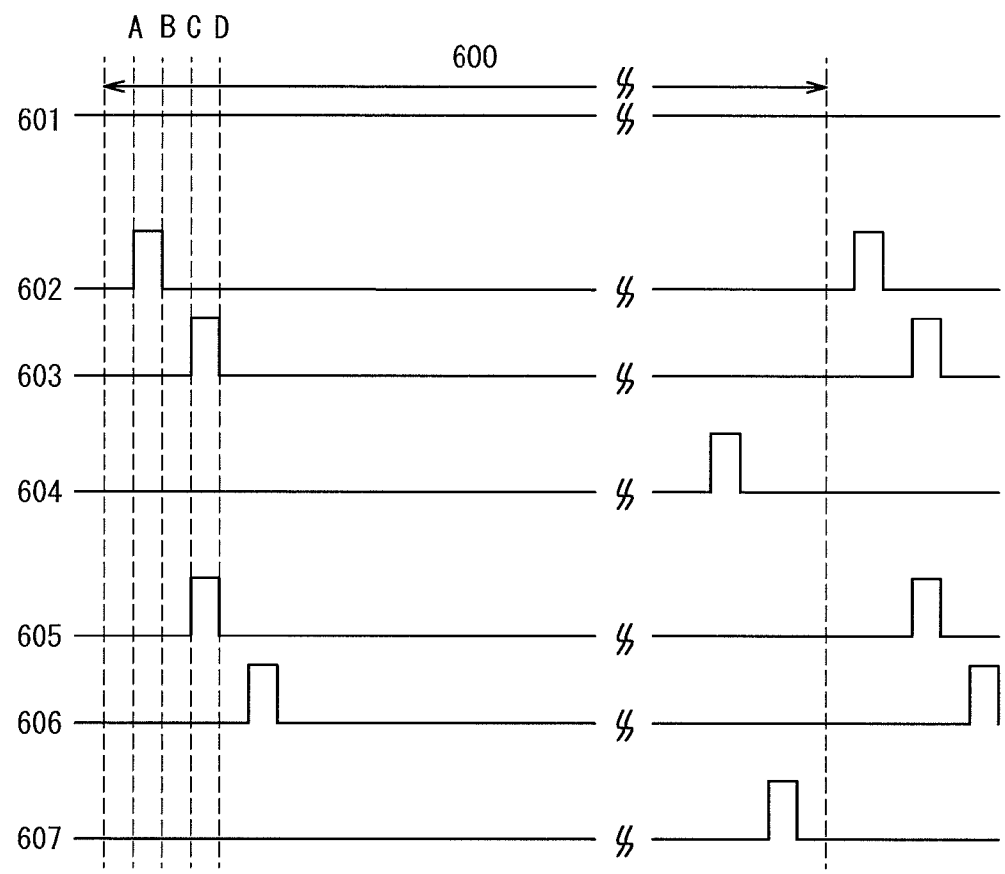
FIG. 6 is a diagram showing an example of a timing chart.
Figure 7:
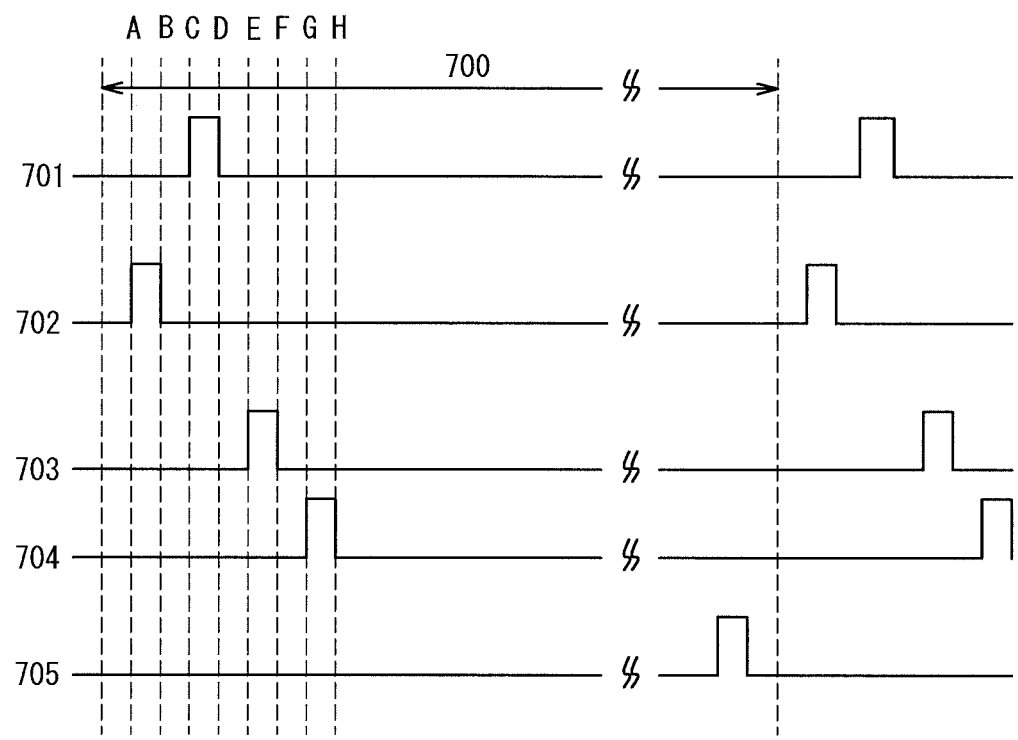
FIG. 7 is a diagram showing an example of a timing chart.
Figure 8:
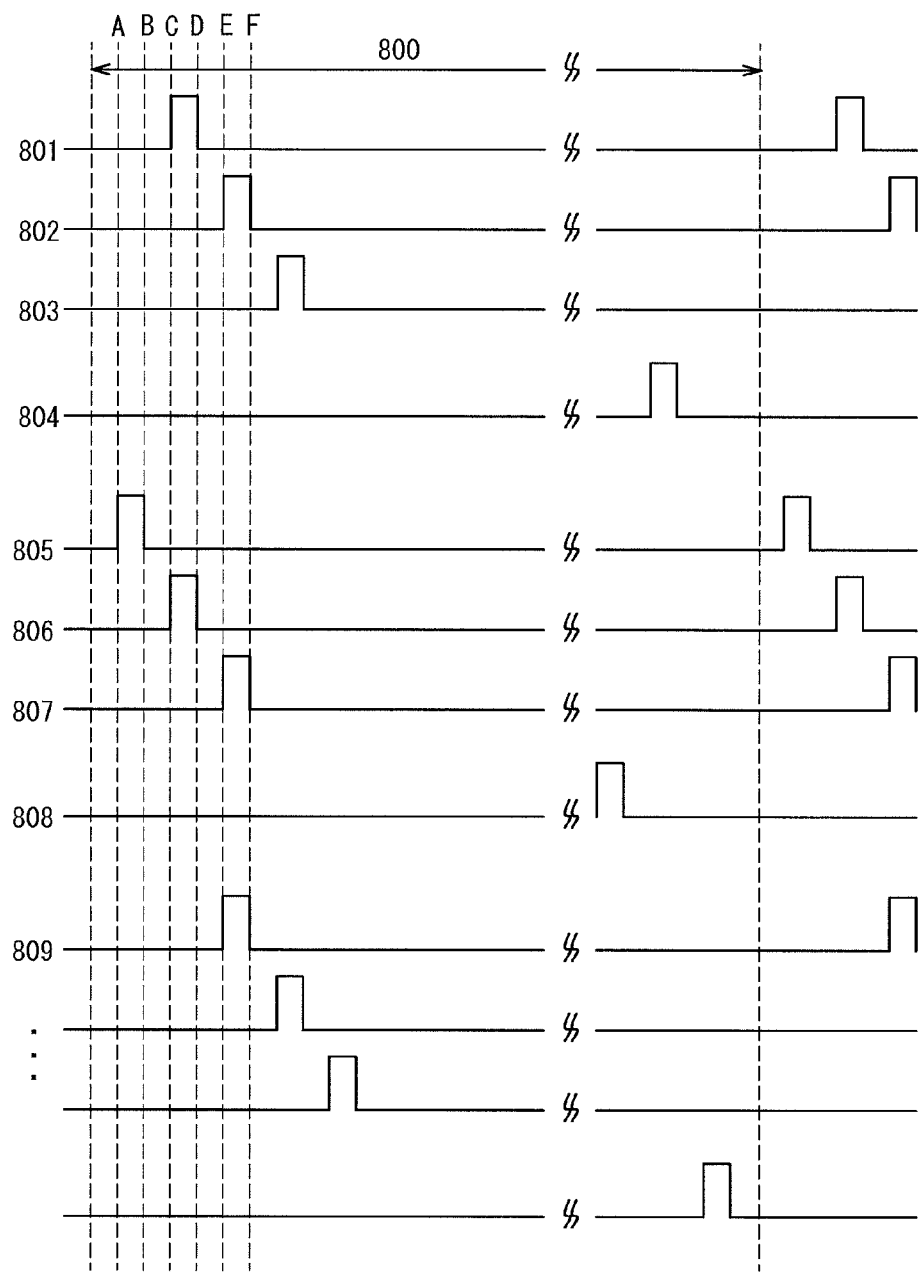
FIG. 8 is a diagram showing an example of a timing chart.
Figure 9A:
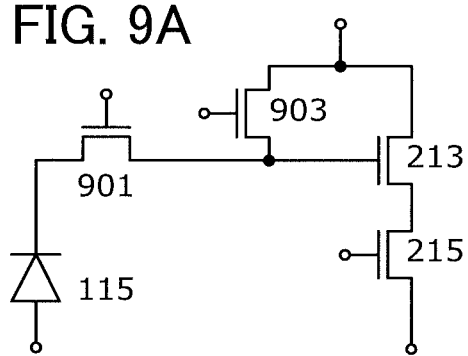
FIGS. 9A to 9G are diagrams showing examples of a circuit configuration of a display device.
Figure 9E:
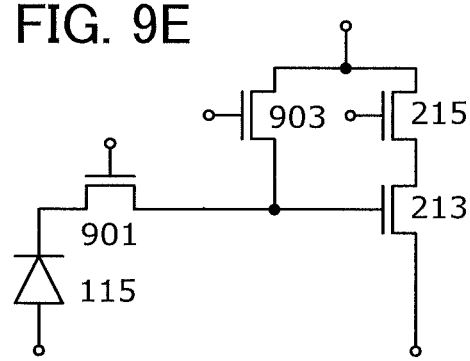
Figure 9B:
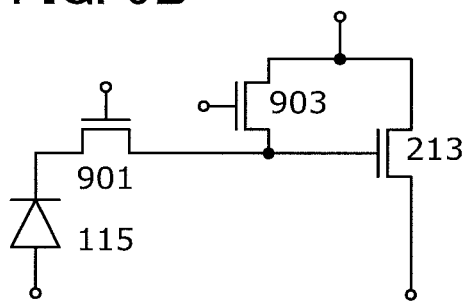
Figure 9F:
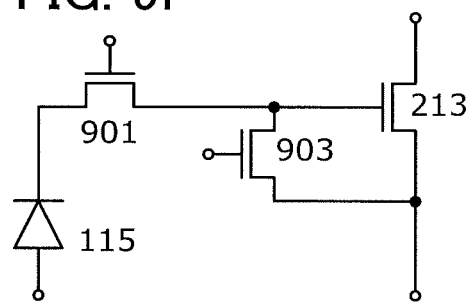
Figure 9C:
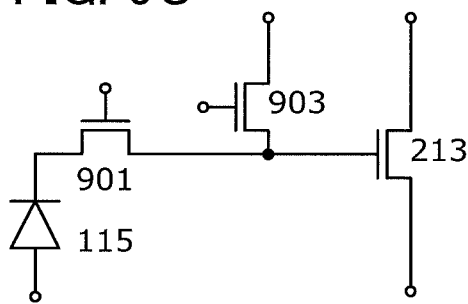
Figure 9G:
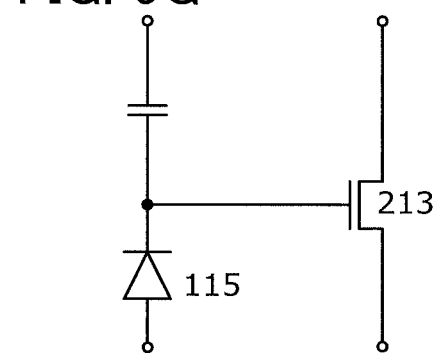
Figure 9D:
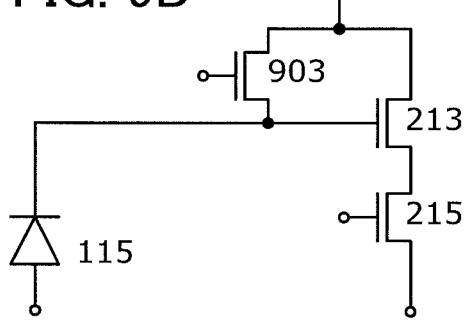

FIG. 6, FIG. 7, and FIG. 8 are timing charts of a pixel portion where the sensor circuit in FIG. 2B are arranged in matrix in n rows and m columns.

FIG. 6 is a timing chart showing the case where a second liquid crystal element 113 allows light to transmit to a light-receiving element 115 all the time. A period 600 is one frame period.

When a signal 601 of a wiring 225 in the first row to an n-th row is always set to "H", light transmits through the second liquid crystal element 113 in the first to the n-th rows and enters the light-receiving element 115.

At a time A, a signal 602 of a wiring 217 in the first row is set to "H", whereby reset operation of a pixel in the first row starts.

At a time B, the signal 602 of the wiring 217 in the first row is set to "L", whereby the reset operation of the pixel in the first row ends and accumulation operation starts.

At a time C, a signal 603 of the wiring 217 in the second row is set to "H", whereby reset operation of the pixel in the second row starts. A signal 605 of a wiring 221 in the first row is set to "H", whereby accumulation operation in the pixel in the first row ends, and then reading operation of the pixel in the first row starts.

At a time D, the signal 603 of the wiring 217 in the second row is set to "L", whereby the reset operation of the pixel in the second row ends and accumulation operation starts. The signal 605 of the wiring 221 in the first row is set to "L", whereby the reading operation of the pixel in the first row ends.

In a similar manner, the reset operation, the accumulation operation, and the reading operation are successively performed in the first to the n-th rows.

After that, the operation at the time A is performed and the same operations as those described above are repeated.

In this case, the signal 601 of a wiring 225 in the first to the n-th rows does not change, so that wirings can be shared and the number of signal driver circuits can be reduced, whereby miniaturization and reduction in power consumption of the sensor circuit can be achieved.

FIG. 7 is a timing chart showing the case where the second liquid crystal element 113 allows light to transmit to the light-receiving element 115 at the same time in the first to the n-th rows. A period 700 is one frame period.

At a time A, a signal 702 of the wiring 217 in the first to the n-th rows is set to "H", whereby reset operation starts in all the pixels in the first to the n-th rows.

At a time B, the signal 702 of the wiring 217 in the first to the n-th rows is set to "L", whereby the reset operation ends in all the pixels in the first to the n-th rows.

At a time C, a signal 701 of the wiring 225 in the first to the n-th rows is set to "H", whereby light passes through the second liquid crystal element 113 in the first to the n-th rows and enters the light-receiving element 115, whereby accumulation operation starts in the pixels in the first to the n-th rows.

At a time D, when the signal 701 of the wiring 225 in the first to the n-th rows is set to "L", light is scattered in a liquid crystal layer 111 of the second liquid crystal element 113 in the first to the n-th rows and does not enter the light-receiving element 115, whereby the accumulation operation ends in all the pixels in the first to the n-th rows.

At a time E, a signal 703 of the wiring 221 in the first row is set to "H", whereby reading operation starts in the pixel in the first row.

At a time F, the signal 703 of the wiring 221 in the first row is set to "L", whereby the reading operation ends in the pixel in the first row.

At a time G, a signal 704 of the wiring 221 in the second row is set to "H", whereby reading operation starts in the pixel in the second row.

At a time H, the signal 704 of the wiring 221 in the second row is set to "L", whereby the reading operation ends in the pixel in the second row.

In a similar manner, all the rows are successively selected from the first to the n-th rows to perform the reading operation.

After that, the operation at the time A is performed and the same operations as those described above are repeated.

In this case, the signal 701 of the wiring 225 in the first to the n-th rows and the signal 702 of the wiring 217 in the first to the n-th rows does not change, so that wirings can be shared and the number of signal driver circuits can be reduced, whereby miniaturization and reduction in power consumption of the sensor circuit can be achieved.

FIG. 8 is a timing chart showing the case where the second liquid crystal element 113 allows light to transmit to the light-receiving element 115 successively in the first to the n-th rows. A period 800 is one frame period.

At a time A, a signal 805 of the wiring 217 in the first row is set to "H", whereby reset operation starts in the pixel in the first row.

At a time B, the signal 805 of the wiring 217 in the first row is set to "L", whereby the reset operation ends in the pixel in the first row.

At a time C, a signal 806 of the wiring 217 in the second row is set to "H", whereby reset operation starts in the pixel in the second row. A signal 801 of the wiring 225 in the first row is set to "H", light passes through the second liquid crystal element 113 in the first row and enters the light-receiving element 115, whereby accumulation operation starts in the pixel in the first row.

At a time D, the signal 806 of the wiring 217 in the second row is set to "L", whereby reset operation ends in the pixel in the second row. The signal 801 of the wiring 225 in the first row is set to "L", light is scattered in the liquid crystal layer 111 of the second liquid crystal element 113 in the first row and does not enter the light-receiving element 115, whereby the accumulation operation ends in the pixel in the first row.

At a time E, a signal 807 of the wiring 217 in the third row is set to "H", whereby reset operation starts in the pixel in the third row. When a signal 802 of the wiring 225 in the second row is set to "H", light passes through the second liquid crystal element 113 in the second row and enters the light-receiving element 115, whereby accumulation operation starts in the pixel in the second row. In addition, a signal 809 of a wiring 221 in the first row is set to "H", whereby reading operation starts in the pixel in the first row.

At a time F, the signal 807 of the wiring 217 in the third row is set to "L", whereby the reset operation ends in the pixel in the third row. The signal 802 of the wiring 225 in the second row is set to "L", light is scattered in the liquid crystal layer 111 of the second liquid crystal element 113 in the second row and does not enter the light-receiving element 115, whereby the accumulation operation ends in the pixel in the second row. In addition, the signal 809 of the wiring 221 in the first row is set to "L", the reading operation ends in the pixel in the first row.

In a similar manner, the reset operation, the accumulation operation, and the reading operation are successively performed in the first to the n-th rows.

After that, an operation at the time A are performed and the same operations as those described above are repeated.

In FIG. 6, FIG. 7, and FIG. 8, signals "H" and "L" of the wiring 225 can be inverted periodically. Thus, deterioration of the liquid crystal layer 111 of the second liquid crystal element 113 can be suppressed, whereby imaging quality can be kept.

This embodiment can be combined with any of the other embodiments as appropriate.

Embodiment 6

In this embodiment, examples of the sensor circuit that are different from FIG. 2B will be described.

FIGS. 9A to 9G are examples of circuits which can be used for the sensor circuit. By providing these circuits and the second liquid crystal element 113, the sensor circuit can be provided. The circuit described here is only an example, so that a different circuit may be used.

Note that a transistor 901 has a function of transferring electric signals from a light-receiving element 115 to a gate of a transistor 213. In addition, a transistor 903 has a function of setting the potential of the gate of the transistor 213 to a given potential.

This embodiment can be implemented in appropriate combination with the other embodiments.

Embodiment 7

In this embodiment, the structure of a display device will be described.

Figure 10:
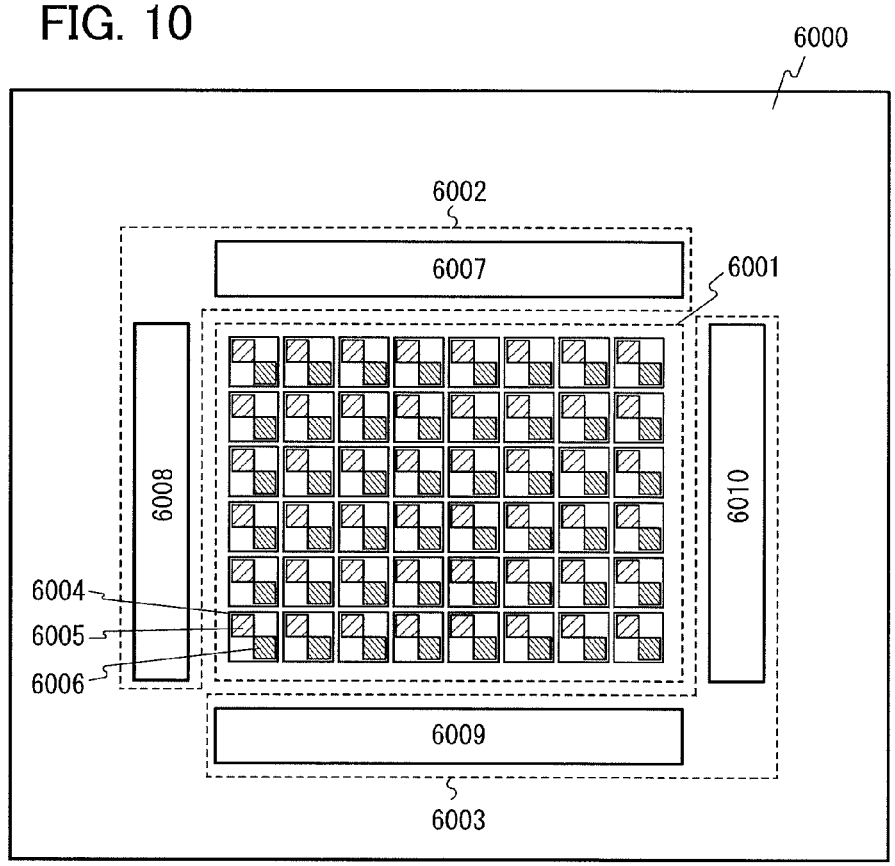
FIG. 10 is a diagram showing an example of a structure of a display device.

FIG. 10 is one example of a display panel included in a display device.

A display panel 6000 includes a pixel portion 6001, a display circuit control portion 6002, and a sensor circuit control portion 6003. The pixel portion 6001 includes pixels 6004 arranged in matrix, each of which includes a display circuit 6005 and a sensor circuit 6006. The display circuit control portion 6002 includes display circuit driver portions 6007 and 6008. The sensor circuit control portion 6003 includes a sensor circuit reading portion 6009 and a sensor circuit driver portion 6010. The display device is applied to a touch panel or the like.

The sensor circuits shown in any of the other embodiments can be applied to the sensor circuit 6006.

Note that the sensor circuit 6006 can be provided outside the pixel 6004. Further, the number of sensor circuits 6006 may be different from that of the display circuits 6005. Then, the sensor circuit 6006 includes a second liquid crystal element 113.

In addition, the display circuit 6005 includes a first liquid crystal element 105.

Further, the display circuit control portion 6002 can be provided outside the display panel 6000. The sensor circuit control portion 6003 can also be provided outside the display panel 6000.

This embodiment can be combined with any of the other embodiments as appropriate.

Embodiment 8

In this embodiment, examples of electronic devices will be described.

Figure 11A:
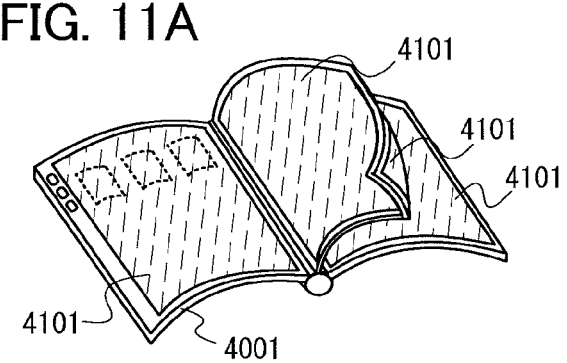
FIGS. 11A to 11F are diagrams showing examples of an electronic device.
Figure 11D:
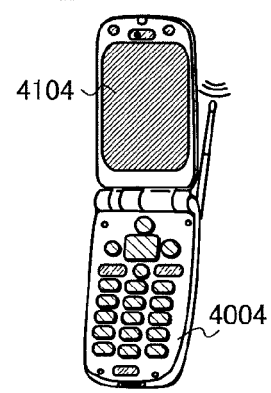
Figure 11B:
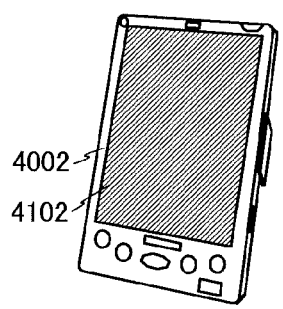

FIGS. 11A and 11B are electronic paper (also referred to as an electronic book). Any of the display devices disclosed in this specification are used for display devices 4101 and 4102 in bodies 4001 and 4002, so that electronic paper with visibility equivalent to that of paper and a touch recognition function can be provided.

Figure 11E:
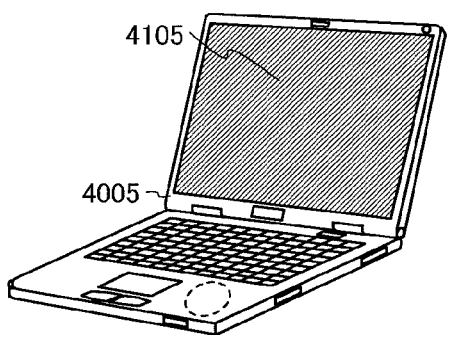
Figure 11C:
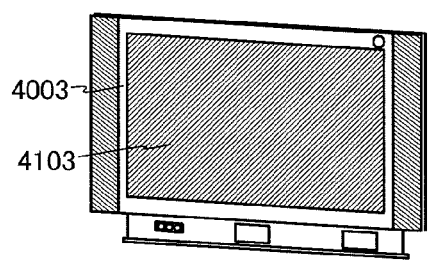
Figure 11F:
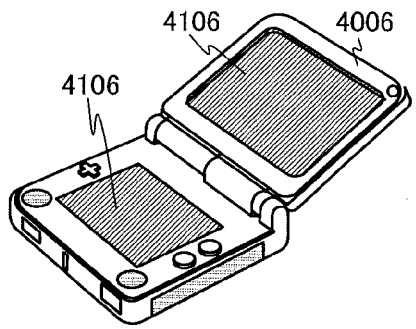

In addition, the display devices 4101 and 4102 can be applied to not only an electronic paper but also to an electronic device such as a television in FIG. 11C, a mobile phone in FIG. 11D, a personal computer in FIG. 11E, or a game machine in FIG. 11F. Any of the display devices disclosed in this specification are used for display devices 4103, 4104, 4105, and 4106 in bodies 4003, 4004, 4005, and 4006, so that an electronic device with visibility equivalent to that of paper and a touch recognition function can be provided.

This embodiment can be combined with any of the other embodiments as appropriate.

Embodiment 9

In this embodiment, examples of electronic devices will be described.

Figure 12:
FIG. 12 is a diagram showing an example of an electronic device.

FIG. 12 illustrates a writing board (e.g., a blackboard and a white board). Any of the display devices disclosed in this specification can be used for a display device 9101 in a body 9001.

Here, a character or the like can be written to the surface of a display device 9101 with a marker or the like.

Note that it is easy to erase characters if the characters are written with a marker or the like without a fixer.

In addition, preferably, the surface of the display device 9101 is adequately smooth in order that the ink of the marker may easily be removed.

For example, when the surface of the display device 9101 is a glass substrate or the like, the smoothness is sufficient.

Alternatively, a transparent synthetic resin sheet or the like may be attached to the surface of the display device 9101.

Preferably, an acrylic resin, for example, is used as the synthetic resin sheet. In this case, the surface of the synthetic resin sheet is preferably smooth.

Further, when the display device 9101 displays a specific image, a user can draw pictures or write characters on the surface. Furthermore, the display device 9101 can superimpose a displayed image with the pictures or the characters because the display device 9101 functions as a scanner.

Furthermore, since a photosensor is used, sensing is possible even after time has passed when the drawing or writing is performed. When a resistive touch sensor, a capacitive touch sensor, or the like is used, sensing can be performed only at the same time as the writing.

This embodiment can be combined with any of the other embodiments as appropriate.

This application is based on Japanese Patent Application serial No. 2010-094600 filed with the Japan Patent Office on Apr. 16, 2010, the entire contents of which are hereby incorporated by reference.

What is claimed is:

1. A display device comprising:
   a pixel comprising a display portion and a sensor portion,
   wherein the display portion comprises a first liquid crystal element comprising a liquid crystal layer including a liquid crystal material and a polymer,
   wherein the sensor portion comprises a light-receiving element having two opposite side edges and a second liquid crystal element comprising the liquid crystal layer including the liquid crystal material and the polymer over the light-receiving element,
   wherein the second liquid crystal element comprises a transparent electrode between the light-receiving element and the liquid crystal layer,
   wherein the transparent electrode overlaps with both side edges of the light-receiving element,
   wherein the first liquid crystal element and the second liquid crystal element are driven independently, and
   wherein the light-receiving element receives light transmitting through the second liquid crystal element.

2. The display device according to claim 1, wherein the first liquid crystal element and the second liquid crystal element include a PDLC.

3. The display device according to claim 1, wherein the first liquid crystal element and the second liquid crystal element include a PNLC.

4. The display device according to claim 1, wherein the light-receiving element includes at least a p-type semiconductor layer and an n-type semiconductor layer.

5. An electronic book comprising the display device according to claim 1.

6. A display device comprising:
   a pixel comprising a display portion and a sensor portion,
   wherein the display portion comprises a first liquid crystal element comprising a pixel electrode, a liquid crystal layer including a liquid crystal material and a polymer, and a counter electrode,
   wherein the sensor portion comprises a light-receiving element having two opposite side edges and a second liquid crystal element comprising a transparent electrode over the light-receiving element, the liquid crystal layer including the liquid crystal material and the polymer, and the counter electrode,
   wherein the transparent electrode overlaps with both side edges of the light-receiving element, wherein the first liquid crystal element and the second liquid crystal element are driven independently, wherein the transparent electrode is electrically independent of the pixel electrode, and wherein the light-receiving element receives light transmitting through the second liquid crystal element.

7. The display device according to claim 6, wherein the pixel electrode is electrically connected to a display circuit control portion and the transparent electrode is electrically connected to a sensor circuit control portion.

8. The display device according to claim 6, wherein the first liquid crystal element and the second liquid crystal element include a PDLC.

9. The display device according to claim 6, wherein the first liquid crystal element and the second liquid crystal element include a PNLC.

10. The display device according to claim 6, wherein the light-receiving element includes at least a p-type semiconductor layer and an n-type semiconductor layer.

11. An electronic book comprising the display device according to claim 6.

12. A display device comprising:
a pixel comprising a sensor portion,
wherein the sensor portion comprises a light-receiving element having two opposite side edges and a liquid crystal element comprising a transparent electrode over the light-receiving element, a liquid crystal layer including a liquid crystal material and a polymer, and a counter electrode,
wherein the transparent electrode overlaps with both side edges of the light-receiving element,
wherein the liquid crystal element is configured to control light reception in the light-receiving element, and
wherein the light-receiving element receives light transmitting through the liquid crystal element.

13. The display device according to claim 12, wherein the liquid crystal element includes a PDLC.

14. The display device according to claim 12, wherein the liquid crystal element includes a PNLC.

15. The display device according to claim 12, wherein the light-receiving element includes at least a p-type semiconductor layer and an n-type semiconductor layer.

16. An electronic book comprising the display device according to claim 12.

17. A display device comprising:
a pixel comprising a display circuit and a sensor circuit,
wherein the display circuit comprises a first transistor controlling input of a video signal and a first liquid crystal element to which the video signal is input,
wherein the first liquid crystal element comprises a pixel electrode, a liquid crystal layer including a liquid crystal material and a polymer, and a counter electrode,
wherein the sensor circuit comprises a light-receiving element converting light into an electric signal and having two opposite side edges, a second transistor generating an output signal from the electric signal, a third transistor controlling reading of the output signal, and a second liquid crystal element,
wherein the second liquid crystal element comprises a transparent electrode over the light-receiving element, the liquid crystal layer including the liquid crystal material and the polymer, and the counter electrode,
wherein the transparent electrode overlaps with both side edges of the light-receiving element,
wherein the first liquid crystal element and the second liquid crystal element are driven independently, wherein the transparent electrode is electrically independent of the pixel electrode, and wherein the light-receiving element receives light transmitting through the second liquid crystal element.

18. The display device according to claim 17, wherein at least one of the first to third transistors comprises an oxide semiconductor.

19. The display device according to claim 17, wherein at least one of the first to third transistors comprises a single crystal semiconductor.

20. The display device according to claim 17, wherein the pixel electrode is electrically connected to a display circuit control portion and the transparent electrode is electrically connected to a sensor circuit control portion.

21. The display device according to claim 17, wherein the first liquid crystal element and the second liquid crystal element include a PDLC.

22. The display device according to claim 17, wherein the first liquid crystal element and the second liquid crystal element include a PNLC.

23. The display device according to claim 17, wherein the light-receiving element includes at least a p-type semiconductor layer and an n-type semiconductor layer.

24. An electronic book comprising the display device according to claim 17.

25. A display device comprising:
a pixel comprising a sensor circuit,
wherein the sensor circuit comprises a light-receiving element converting light into an electric signal and having two opposite side edges, a first transistor generating an output signal from the electric signal, a second transistor controlling reading of the output signal, and a liquid crystal element,
wherein the liquid crystal element comprises a transparent electrode over the light-receiving element, a liquid crystal layer including a liquid crystal material and a polymer, and a counter electrode,
wherein the transparent electrode overlaps with both side edges of the light-receiving element,
wherein the liquid crystal element is configured to control light reception in the light-receiving element, and
wherein the light-receiving element receives light transmitting through the liquid crystal element.

26. The display device according to claim 25, wherein at least one of the first and second transistors comprises an oxide semiconductor.

27. The display device according to claim 25, wherein at least one of the first and second transistors comprises a single crystal semiconductor.

28. The display device according to claim 25, wherein the liquid crystal element includes a PDLC.

29. The display device according to claim 25, wherein the liquid crystal element includes a PNLC.

30. The display device according to claim 25, wherein the light-receiving element includes at least a p-type semiconductor layer and an n-type semiconductor layer.

31. An electronic book comprising the display device according to claim 25.

32. A display device comprising:
a pixel comprising a transistor over a substrate;
a light-receiving element over the substrate and having two opposite side edges;
an insulating layer over the transistor and the light-receiving element;
a pixel electrode on the insulating layer, the pixel electrode being electrically connected to the transistor;

a transparent electrode on the insulating layer, the transparent electrode being overlapped with the light-receiving element and electrically independent of the pixel electrode; and a liquid crystal layer over the pixel electrode and the transparent electrode, the liquid crystal layer including a liquid crystal material and a polymer, wherein the transparent electrode overlaps with both side edges of the light-receiving element.

33. A display device including a pixel, the pixel comprising:

a switch over a substrate;

a light-receiving element over the substrate and having two opposite side edges;

an insulating layer over the switch and the light-receiving element;

a first light transmitting electrode on the insulating layer, the first light transmitting electrode being electrically connected to the switch;

a second light transmitting electrode on the insulating layer, the second light transmitting electrode being overlapped with the light-receiving element and electrically independent of the first light transmitting electrode; and a liquid crystal layer over the first light transmitting electrode and the second light transmitting electrode, the liquid crystal layer comprising a liquid crystal material and a polymer, wherein the second light transmitting electrode overlaps with both side edges of the light-receiving element.

* * * * *